(12) United States Patent
Sparks et al.

(10) Patent No.: US 6,222,838 B1
(45) Date of Patent: Apr. 24, 2001

(54) METHOD AND SYSTEM FOR DELIVERING AUDIO AND DATA FILES

(75) Inventors: Randall B. Sparks, Lafayette; Kyle D. Habermehl, Niwot; Scott A. Dooley, Longmont; Bradley S. Reeves, Berthoud; James L. Lane, Boulder, all of CO (US); Sherman Woo, Seattle, WA (US); Dereck A. Stertz, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 08/979,379

(22) Filed: Nov. 26, 1997

(51) Int. Cl.$^7$ .................................................. H04L 12/64
(52) U.S. Cl. ........................................... 370/352; 370/354
(58) Field of Search .................................... 370/352–356; 379/266

(56) References Cited

U.S. PATENT DOCUMENTS

| 5,793,980 | * | 8/1998 | Glaser et al. .................... 395/200.61 |
| 5,884,032 | * | 3/1999 | Bateman et al. ................. 395/200.34 |
| 6,014,439 | * | 1/2000 | Walker et al. ........................ 379/266 |

\* cited by examiner

Primary Examiner—Melvin Marcelo
(74) Attorney, Agent, or Firm—Brooks & Kushman P.C.

(57) ABSTRACT

A method and system for delivering audio and data files includes a data network and a voice network. A user station provided in communication with the data network receives data files. A telephone provided in communication with the voice network receives audio files. An application server in communication with the data network stores and executes applications programs which include audio features. An audio server in communication with the application server and the voice network is operative to dial a telephone, deliver a selected audio file to the telephone, or record and store an audio file.

18 Claims, 4 Drawing Sheets

METHOD AND SYSTEM FOR DELIVERING AUDIO AND DATA FILES

TECHNICAL FIELD

This invention relates to a method and system for delivering audio and data files to a user via a data network and voice network.

BACKGROUND ART

In an effort to reduce the development, deployment and maintenance costs associated with computer applications, many new applications and services are now being deployed as distributed, client-server applications on Internet and/or private corporate intranets using World Wide Web technologies, such as, for example, the Hypertext Transport Protocol (HTTP) and Hypertext Markup Language (HTML). Many of these applications involve the use of multi-media sub-applications, including audio and audio-related components.

Typically an audio file is delivered to a user by downloading it using a program such as a Web browser and playing it using a helper application or browser "plug-in." Several file compression and streaming technologies have been developed to improve the performance of downloaded audio and other media delivered over the above-described distributed, client-server applications. In addition to the delivery of audio materials, several companies have also developed methods for two-way voice communications over the same networks. In other words, both audio and data files are delivered to the user via the data network.

As those skilled in the art will recognize, the transport of audio and data files over a data network is both time-consuming and resource intensive. More specifically, such transmission takes a substantial amount of bandwidth and thus causes significant transmission delays, which are undesirable from a user perspective. In a typical prior art application, audio files such as voice are saved on hard disk and sent across the Internet or an intranet. This approach also requires a substantial amount of storage.

Consequently, a need exists for a method and system for delivering audio and data files to a user which reduces the strain on network resources, namely bandwidth and storage, and which may be performed in a timely and efficient manner. Such a method and system should also provide for the two-way transport of audio for both recording and playback in a manner that is tightly coordinated with the display of a client-server application and which allows the transport of audio to be flexibly directed across the data network or voice network, whichever best accommodates a particular individual user in a particular situation. Finally, such a method and system should transport audio and data files in a manner which is transparent to the user.

SUMMARY OF THE INVENTION

It is an object of the present invention to provide a method and system for delivering audio and data files to a user over a common or independent networks, namely a data network and a voice network, at the discretion of the user in a manner which reduces the strain on network resources and improves network efficiency.

In accordance with the above objective, there is provided a method for delivering audio and data files which includes the provision of both a data network and a voice network. A user workstation is provided in communication with the data network for receiving data files. Similarly, a telephone is provided in communication with the voice network for receiving audio files. There is further provided an application server and an audio server. The application server stores and executes application programs that include audio features, such as playing and recording audio files. The application server is provided in communication with both the user workstation and the audio server via the data network. The audio server is similarly provided in communication with both the voice network and with the application server via the data network as well.

At the user's request, the application server can instruct the audio server to (1) establish an audio connection channel with the user by dialing a telephone or receiving a telephone call from the user, or (2) deliver or record an audio file either via the telephone or via the data network. Alternatively, the application and audio server functions may be implemented as a single program.

In carrying out the above method, there is similarly provided a system for delivering files to and receiving audio to record from the user. As in the above-described method, the system includes a workstation in communication with a data network for receiving data files. The system further includes a telephone in communication with a voice network for delivering audio files and receiving audio to record from the user.

Still further, there is provided an application server and an audio server. The application server is provided in communication with the data network for storing audio-enabled application programs executable by the user from the user workstation. The audio server, in turn, is operative to dial the telephone or deliver a selected audio file to the telephone or the workstation via the data network or voice network, all at the option of the user.

In a typical embodiment, the user's client application is a Web browser, which communicates with the application server via a Web (HTTP) server. The Web server communicates with the application server via the Common Gateway Interface (CGI) or another, similar Application Programming Interface (API). The application server stores and executes the programs that generate "Web pages" or other user interface components (such as, for example, Java Applets or ActiveX components) which, when displayed by the browser, allow the user to, among other actions, control the playing and recording of selected audio files. To accomplish this, the user's request is communicated (through the Web server via CGI) to the application server which, in turn, makes a request of the audio server to perform the appropriate audio-related function.

In keeping with the invention, the data network may be any Transmission Control Protocol/Internet Protocol (TCP/IP) based network such as the Internet or corporate intranet, or any similar network using a similar protocol. The voice network preferably, but not necessarily, comprises the Public Switched Telephone Network (PSTN). Any suitable alternative, however, may be utilized, such as, for example, an Integrated Services Digital Network (ISDN).

BEST MODES FOR CARRYING OUT THE INVENTION

Figure 1:
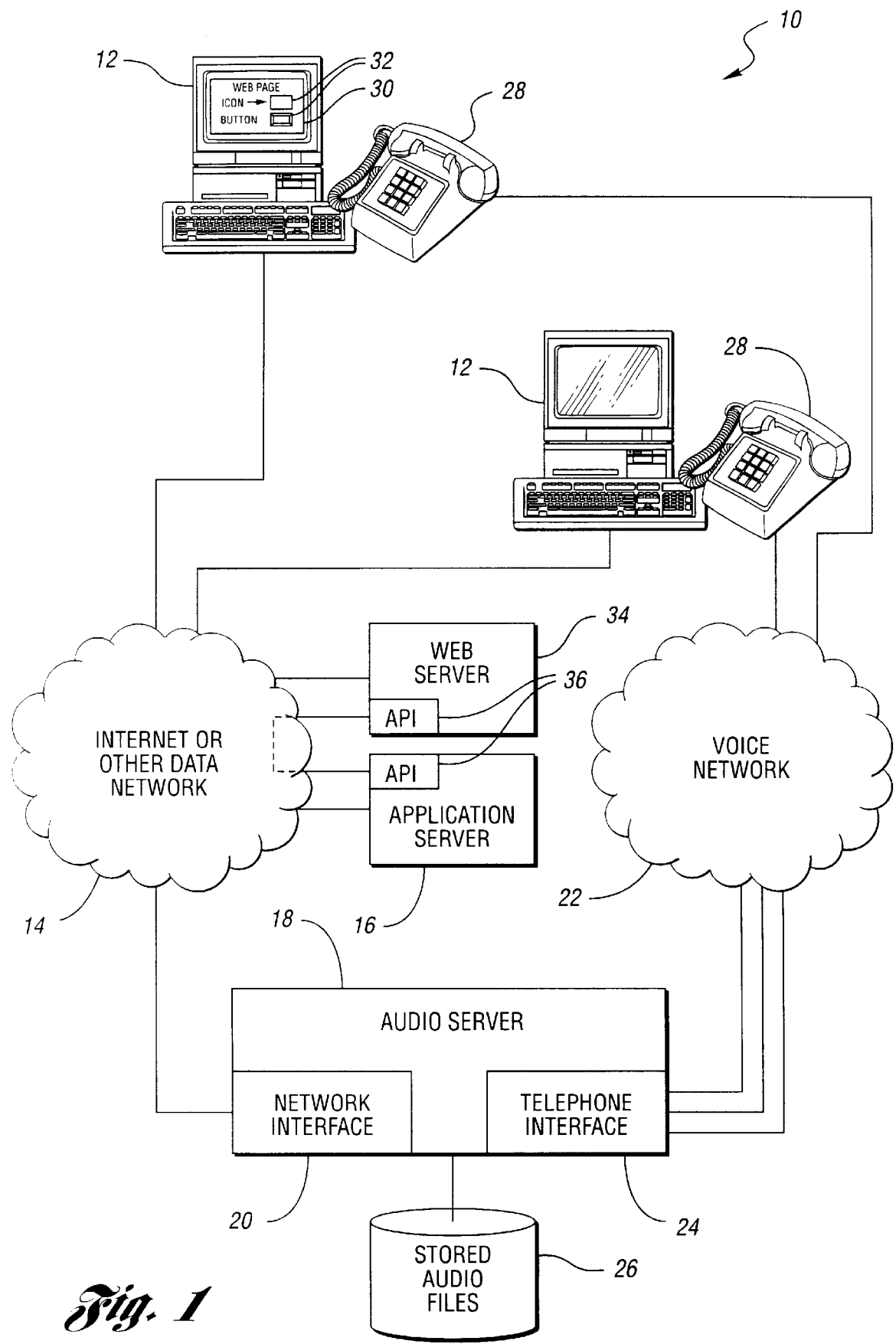
FIG. 1 is a generalized schematic diagram of the system of the present invention.

Referring to FIG. 1, there is shown a generalized schematic diagram of the system of the present invention designated generally by reference numeral 10. The system includes at least one and preferably a plurality of workstations 12. The workstations 12 are provided in communication with a data network 14 such as, for example, the Internet or a private corporate intranet, using World Wide Web technologies such as, for example, the HTTP protocol, HTML protocol, and Web browsers and servers, CGI, etc. Data network 14 is similarly provided in communication with an application server 16 as well as an audio server 18 via network interface 20. Audio server 18 may include, for example, an Automatic Call Distribution (ACD) module (not shown), in communication with a Voice Response Unit (VRU) (not shown). Various other embodiments are contemplated depending on the specific application and are intended to be within the scope of the invention. Regardless of its specific design, audio server 18 is provided in communication with a voice network 22 such as a Public Switched Telephone Network (PSTN), an Integrated Services Digital Network (ISDN), or any other suitable voice network via a telephony interface 24. Audio server 18 is operative to store audio files on a data store such as database 26 and record and deliver the same via the data network 14 or voice network 22 to the user. In the latter case, audio files are delivered to the user via a telephone 28 which is provided in communication with voice network 22. In a preferred embodiment, a telephone 28 is located in proximity to each workstation 12. Alternatively, equivalent telephone functionality may be achieved through use of a computer telephony device internal to the workstation.

Referring still to FIG. 1, it can be seen that workstation 12 is provided in communication with data network 14 for receiving data files. In a preferred embodiment, the application is implemented with an application server 16, which stores and executes a program or programs that carry out the various functions of the application. These functions include one or more manipulations of audio, such as playing and recording audio files, and may also include such functions as connecting to databases, management information systems, or other types of information systems.

In the embodiment shown, the interface comprises a Web page 30 having display elements 32 such as, for example, icons, buttons or hypertext links which are presented to the user for selection. Using standard Web technology, a user may submit a request that includes the user's telephone number, which the system may then use to call the user to establish an audio communication channel over the voice network 22. Alternatively, the user may request that the system provide a number that the user can call to establish the same type of audio channel. Another alternative is to provide transport of audio over the data network (e.g., using standard Web-based audio techniques).

Once an audio communication channel between the system and the user has been established, a similar process may be used for further requests from the user. For example, the user may select an icon or button 32 to instruct the system to deliver (i.e., play) a recorded audio file, to record input from the user, or to terminate interaction with the user and close the audio communication channel (i.e., hang up the phone in the case where the audio channel is over a voice network).

As shown in FIG. 1, the client may communicate with the application server 16 via a Web server 34, typically using TCP/IP via CGI or some other application programming interface 36. For user requests that involve one of the audio features of the system (establishing or terminating an audio communication channel with the user, or playing or recording audio files), the application server 16 instructs the audio server 18 to carry out that request. For example, the application server 16 may instruct the audio server 18 to call the number provided by the user through the voice network 22 provided for by the system. The telephone line used for this purpose is "seized" or "held" while more requests are made. Once this phone call has been established, a subsequent request to play a particular audio file will cause the application server 16 to instruct the audio server 18 to retrieve the file and play it over the telephone. Similarly, a request to record will cause the audio server 18 to record audio input from the user over the telephone until the user instructs the system to stop recording (or until some time limit has been reached).

In summary, the example of the system described above allows a Web-based client to submit a request from a Web page 30, which will instruct the application server 16 to perform a variety of functions, including dialing the user's telephone number or receiving a call from the user to establish an audio communication channel, as well as playing and recording audio files, and, finally, closing the established audio communication channel.

While the preferred mode of implementation may use World Wide Web technology, the system may also be implemented using other computer hardware and software technologies that provide similar functionality, such as, for example, X windows, native Microsoft Windows, MacIntosh, or other user interface components, etc. Additionally, while in the example given here for the preferred mode of implementation, the client program, the application server 16 and the audio server 18 are described as separate system components (separate programs) running on separate computers, some or all of these functions may be combined into single components. For example, the application server 16 and audio server 18 may be implemented as a single program.

An example for use of the system described in FIG. 1 occurs when a corporation develops a training application to be delivered over a data network such as the World Wide Web or private corporate intranet. The application trains customer service representatives how to interact with customers and allows them to practice with simulated customers by listening to recorded conversation fragments and recording themselves.

When the user of this application is at work, the corporate data network may have sufficient bandwidth to deliver both the application display (e.g., in a browser) and the recorded audio files to the user using standard browser-based techniques as data packets. However, for this training application to be successful, two additional capabilities must be in place: (1) the playing of the recordings and the events on the user's screen display must be carefully coordinated, and (2) a means must be provided for users to record themselves (and have this stored for later playback). Furthermore, there are situations in which delivery of audio over the data network may be problematic enough to significantly reduce the usability of the application or even make it unusable.

The audio server described herein addresses these situations by providing a means by which the application's visual display is handled in the usual way by a data network, i.e., the Internet or corporate intranet, but which further allows two-way audio to be provided either over the same data network or over a voice network such as the telephone network. For example, some personal computers and workstations do not have integrated audio capabilities. For example, most X-terminals do not have this capability, nor do PC's without sound cards or microphones. In these cases, applications that rely on audio, such as the training application described above, cannot be used, even though these platforms are perfectly capable of handling the visual display of client-server applications.

In addition, even when a user's workstation has audio capabilities, the performance of an audio-intensive application may be significantly improved when the audio is delivered over a voice network such as the telephone network. This would be the case, for example, when connecting to the application's server over a modem or other low-bandwidth or less reliable network.

The audio server described herein provides a network service to network-based (distributed, client-server) computer applications by which those applications may play and record audio material. A client (user) of the audio server (which may itself be an application server with its own clients) may request several audio services from the audio server. These requests include the delivery of recorded and stored audio material for playback and the recording and storage of new audio material as audio computer files, which then become available from the audio server for future delivery and playback. Interaction with the audio server is over a data network, such as the Internet, a corporate intranet, some other TCP/IP-based network, or a network using some other protocol. Transport of audio is provided over the same data network or over a voice network such as the Public Switched Telephone Network as described above. Transport could also be provided over an alternative data or voice network, such as an Integrated Services Digital Network (ISDN). In addition, the audio server is operative to provide services related to the creation, organization, and maintenance of the audio material associated with the server.

The audio server runs on a networked computer and listens for requests on a designated port. When a client (user) program connects to the audio server, it can request that a session be established for a particular user, which will be maintained until the client requests that the session be terminated. Of course, certain error conditions may also terminate a session. The audio server thus can accommodate multiple, concurrent clients limited only by availability of the computing resources associated with the server.

After a user session has been established, the client may take a series of service requests of the audio server. These include requesting that subsequent audio requests be provided over a particular transport medium—either the data network or the telephone network, that audio resources available on the server be identified and listed, that a particular audio file be delivered to the client, or that audio produced by the client's user be recorded and saved for future use under a particular identifier, i.e., file name.

As described above, to accommodate audio transport over the telephone network, the audio server runs on a workstation (PC or otherwise) with telephony capability (a computer telephone card and software, etc.) and is connected to one or more telephone lines. The number of lines, of course, depends on the requirements of the application to be supported by the audio server. When a client requests that subsequent audio be transported over the telephone network, the audio server allocates one of its several telephone lines to the client's session. The client may then request the telephone number of this line and have the user call in to the audio server or otherwise establish a connection between the user and the audio server. Alternatively, the client may provide a user telephone number and request that the audio server call this number which presumably, will be answered by the user.

In order to coordinate the application's visual display and audio events, the audio server may also provide the client with a set of audio-related commands to which it responds, such as, for example, "record," "play," "stop," "pause," "continue," "rewind," or "fast forward," etc. These commands will work in the same way from the user's perspective, regardless of whether audio transport is provided over the data or telephone network. Thus, after an audio connection has been established, users may proceed to interact with the application, using both the visual display (for playing a recorded audio, as well as other application functions) in the established audio transport mechanism.

Figure 2:
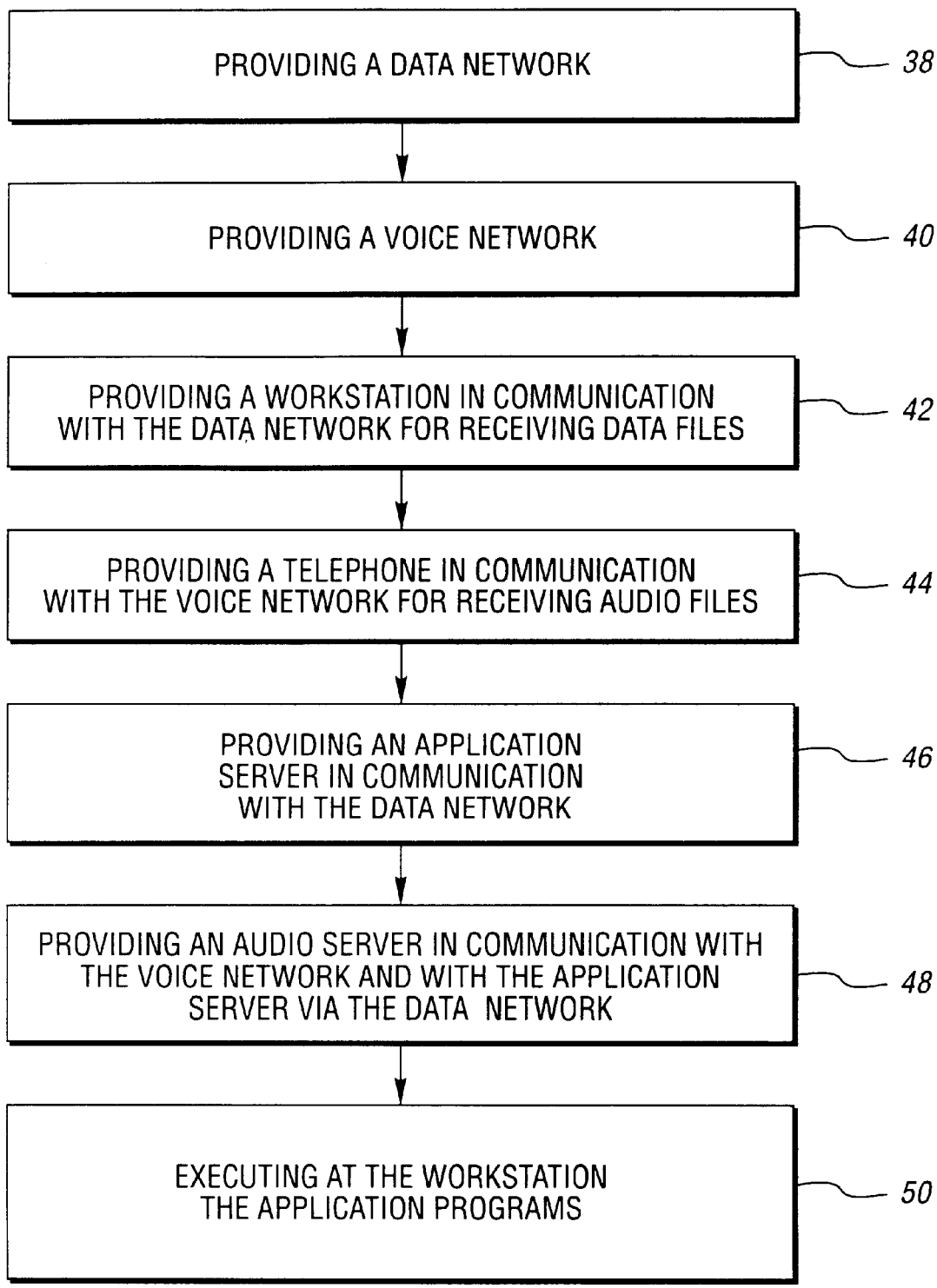
FIG. 2 is a generalized block diagram of the method steps of the present invention.

With reference now to FIG. 2 of the drawings, there is shown a generalized block diagram of the method steps of the present invention. As shown, these steps include providing 38 a data network and providing 40 a voice network. The method further includes providing 42 a workstation in communication with the data network for receiving data files and providing 44 a telephone in communication with the voice network for receiving audio files. Still further, the method includes providing 46 an application server in communication with the data network for storing and executing application programs that include audio features. Still further, the method includes providing 48 an audio server in communication with the voice network and application server via the data network. Finally, the method includes executing 50 at the workstation the application programs to request the audio server to dial or answer the telephone or deliver a selected audio file to the user or record and store audio input from the user via the voice or data network.

Figure 3:
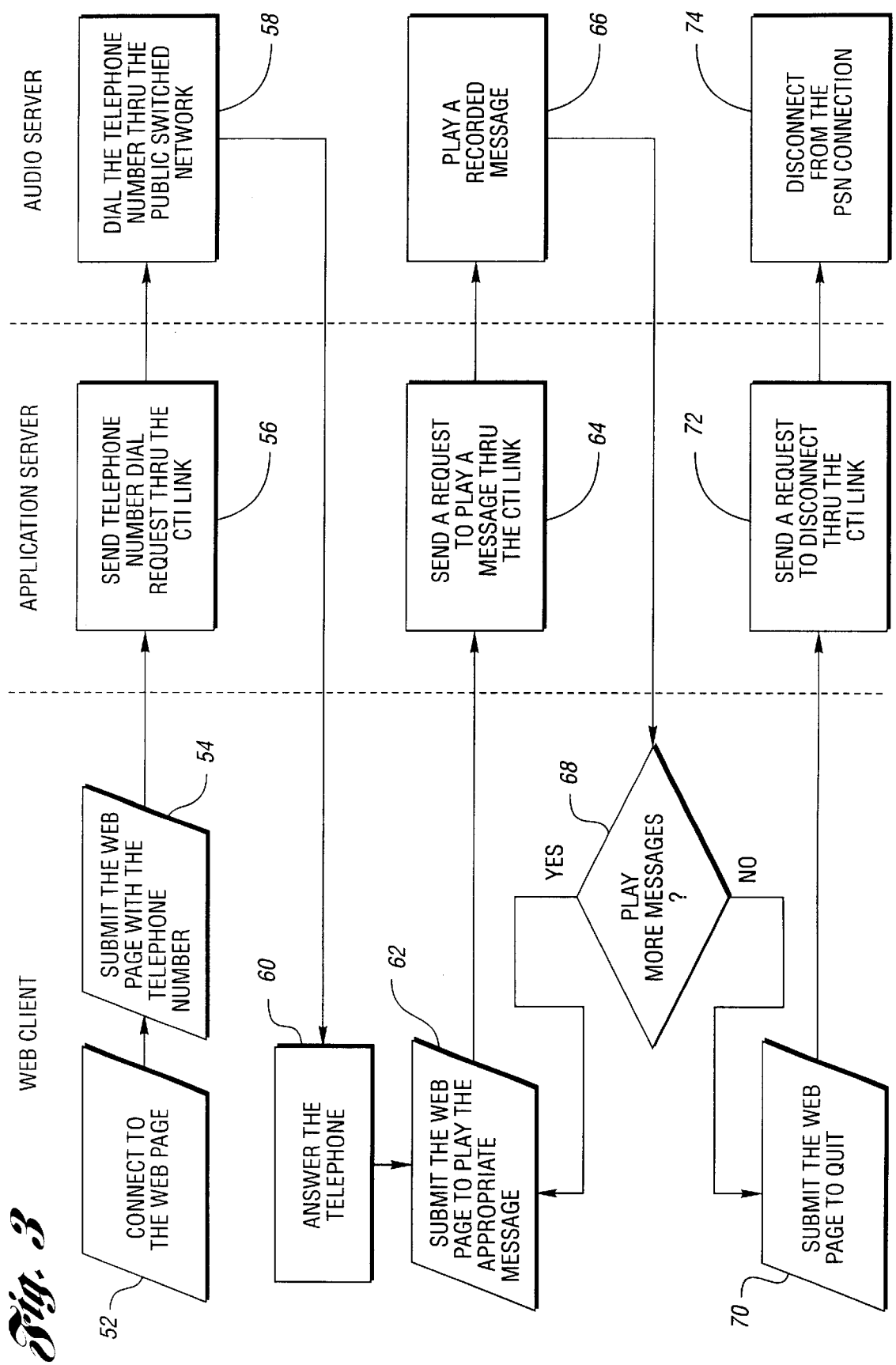
FIG. 3 is a process flow diagram illustrating the interaction between and among the system components of the present invention.

Turning now to FIG. 3, there is shown a process flow diagram to illustrate a typical interaction between and among the system components of the present invention. As shown, a user, a Web client in this example, connects to an interface (a Web page) at block 52. The Web client thereafter submits the Web page to an application server as shown at block 54. The application server thereafter sends the telephone number dial request to the audio server as shown at block 56.

The audio server thereafter dials the telephone number through a Voice Network such as the Public Switched Telephone Network as shown at block 58. The user's telephone, which is provided in communication with the voice network, answers the telephone at block 60 and thereafter submits a request from a Web page to play the appropriate message as shown at block 62. The Web page is submitted to the application server which, in turn, sends a request to the audio server to play a message as shown at block 64. The telecommunications equipment, in turn, plays the requested message as shown at block 66.

At decision block 68, it is determined if more messages are required to be played. If the answer is in the affirmative, the process flow returns to block 62. If the answer is in the negative, the Web client submits the Web page to the application server to "quit" as shown at block 70. The application server, in turn, sends a request to the audio server to disconnect as shown at block 72. Finally, the telecommunications equipment disconnects from the PSTN connection as shown at block 74.

Figure 4:
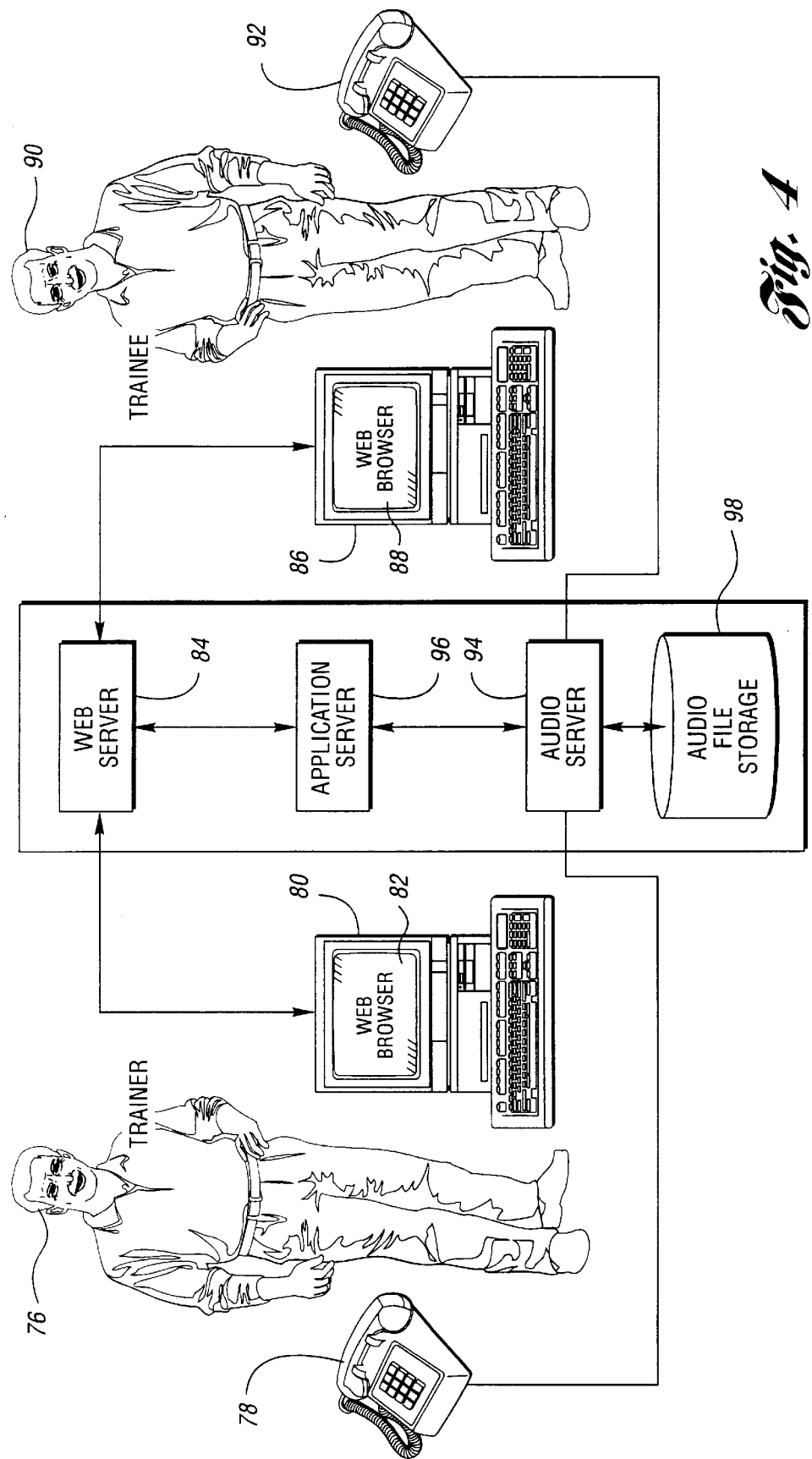
FIG. 4 is a schematic diagram illustrating the present invention in connection with a trainer/trainee application.

The above-described process flow may also be better understood with reference to FIG. 4 of the drawings which is specifically directed to a trainee/trainer application.

As FIG. 4 shows, a trainer 76 having a telephone 78 and workstation or other suitable computer 80 (including a Web browser 82) may use the system to develop a training application, including audio features. In operation, the trainer 76 records examples to be played later by trainee 90, along with other program logic, such as sequencing information, etc. After this development is complete, the application is made available to the trainee 90. Both the trainer 76 and the trainee 90 log on using their respective Web browsers 82 and 86, establish the audio connection to their telephones 78 and 92, then alternatively play and record audio or perform other actions, then log off the system.

As shown, the trainer's workstation 80 is provided in communication with the workstation 86 (also including a Web browser 88) of a trainee 90 via a user server 84. The trainee 90 is also equipped with a telephone 92 which is provided in communication with the trainer's telephone 78 via an audio server 94. Audio server 94, in turn, is provided in communication with an audio file storage device 98 and an application server 96. The application server 96 is provided in communication with Web server 84.

While the best modes for carrying out the invention has been described in detail, those familiar with the art to which this invention relates will recognize various alternative designs and embodiments for practicing the invention as defined by the following claims.

What is claimed is:

1. A system for delivering audio and data files to a user, comprising:
   a data network;
   a voice network;
   a user workstation in communication with the data network for receiving data files:
   a telephone in communication with the voice network for receiving audio files;
   an application server in communication with the data network for storing and executing applications programs that include audio features; and
   an audio server in communication with the application server and the voice network, the audio server operative to dial the telephone, and to deliver the audio features of the programs from the application server to the telephone.

2. A system as in claim 1, further comprising a Web server in communication with the data network and having an Applications Programming Interface (API).

3. A system as in claim 2, wherein the API is a Common Gateway Interface (CGI).

4. A system as in claim 1, wherein the telephone is located in proximity to the workstation.

5. A system as in claim 1, wherein the telephone is provided for by computer telephony equipment inside the workstation.

6. A system as in claim 1, wherein the audio server comprises computer telephone equipment for establishing and maintaining telephone network connections with one or more users.

7. A system as in claim 6, wherein the computer telephone equipment comprises an Automatic Call Distribution (ACD) module in communication with a Voice Response Unit (VRU).

8. A system as in claim 1, wherein the application server comprises one or more computer programs run on one or more computers running an operating system.

9. A system as in claim 1, wherein the application server comprises a Web server in communication with a Management Information System (MIS) server via an Application Programming Interface (API).

10. A system as in claim 1, wherein the data network is the Internet.

11. A system as in claim 1, wherein the data network is an intranet.

12. A system as in claim 1, wherein the voice network is the Public Switched Telephone Network (PSTN).

13. A system as in claim 1, wherein the data network is a Transmission Control Protocol/Internet Protocol (TCP/IP) based network.

14. A system as in claim 1, wherein the voice network is an Integrated Services Digital Network (ISDN).

15. A system as in claim 1, wherein the audio server is operative to deliver a selected audio file to the telephone in coordination with the user's selection of a display element.

16. A system as in claim 1, wherein the audio server is operative to record and play audio files in coordination with the user's selection of a display element.

17. A method for delivering audio and data files to a user, comprising:
   providing a data network;
   providing a voice network;
   providing a user workstation in communication with the data network for receiving data files;
   providing a telephone in communication with the voice network;
   providing an application server in communication with the data network, the application server having stored thereon applications programs that include audio features;
   providing an audio server in communication with the application server and the voice network; and
   executing at the server the applications programs to request the audio server to dial the telephone, and to deliver the audio features of the program from the application server to the telephone.

18. The method as in claim 17 further comprising providing a Web server in communication with the data network and having an Application Programming Interface (API).

* * * * *